United States Patent Office 3,524,841
Patented Aug. 18, 1970

3,524,841
CATALYSTS FOR THE POLYMERIZATION OF 1,3-BUTADIENE, THEIR METHODS OF PREPARATION AND USE
Richard Rodney Durst, Stow, Ohio, assignor to The General Tire & Rubber Company, a corporation of Ohio
No Drawing. Continuation-in-part of application Ser. No. 492,291, Oct. 1, 1965. This application Sept. 16, 1968, Ser. No. 760,075
Int. Cl. C08d 3/06
U.S. Cl. 260—94.3
9 Claims

ABSTRACT OF THE DISCLOSURE

Homogeneous catalysts of the organometallic class are prepared by mixing in specific manner a solvent, titanium tetraiodide, organic amine and trialkyl aluminum. Polymerization of 1,3-butadiene with these catalysts yields high molecular weight polymer high in cis-1,4 content, with excellent processability on both cold and hot roll mills and useful for the manufacture of automobile tires and mechanical goods and in master batching.

CROSS-REFERENCE TO RELATED APPLICATION

Reference is made under the provision of 35 U.S.C. 120 to copending application Ser. No. 492,291, filed Oct. 1, 1965, of which this application is a continuation-in-part.

FIELD OF THE INVENTION

The polymerization of butadiene has been the subject of extensive research and development. This diolefin may be polymerized in a multitude of basically different ways to produce a variety of polymers ranging from low molecular weight liquid polymers through hard brittle resins to high molecular weight elastomers. The present invention concerns that field of butadiene polymerization in which high molecular weight elastomeric polymers are formed.

In the early stages of butadiene polymerization, the available catalysts and techniques were incapable of controlling distribution and configuration of the polymer molecules. Many methods are described in the literature for polymerizing 1,3-butadiene to polymers containing various microstructures. The older methods, vis, emulsion polymerization, alkali metal-catalyzed polymerization and alfin-catalyzed polymerization, gave polymers that were deficient in processability.

Although such early art permitted the molecular weight of the polymers to be controlled to some extent, the molecular configuration of the polymers was uncontrolled and polymers of completely random structure were produced. More recently, techniques of butadiene polymerization have been developed using organometallic heterogeneous catalysts with the capability of giving a directive effective to the orientation of the molecules forming the polymers. Using this class of catalyst, it is now possible to control the manner of addition of molecules of the monomer to one another so as to form polymers which are prevailingly or substantially of one of several possible geometric configurations, e.g., production of polybutadiene which is essentially all cis-1,4 or trans-1,4 structure.

Polybutadiene having a structure which is prevailingly cis-1,4 is of great commercial importance because it is similar in properties to natural Hevea rubber. Such cis-1,4 polybutadiene may have the nerve, elongation, tack, film forming and processability properties of natural rubber or even superior thereto. The preparation of catalysts and their use in polymerizing 1,3-butadiene into a high molecular weight polymer that is prevailingly cis-1,4 is described, for example, in U.S. Pat. 3,206,448. The catalyst used in these known polymerizations is of the organometallic heterogeneous type and contains the elements titanium, iodine and aluminum in conjunction with an organic amine. The present invention concerns organometallic type catalysts, but of a homogeeous class rather than the heterogeneous class described in U.S. 3,206,448.

It is known that in the use of stereoregulating organometallic catalysts, polymers of varying properties may be obtained when compared as to their microstructure, macrostructure, molecular weight distribution and processability. Thus, some polymers produced by such catalysts cannot be processed satisfactorily without blending with natural rubber. On the other hand, other polymers made with these catalysts, while being processable without blending, yield poor physical properties in vulcanized compositions containing high contents of carbon black or oil loadings. Likewise, available polybutadienes made with this class of catalyst may tend to lose their superior mechanical properties when blended with natural rubber or butadiene-styrene elastomers, e.g., they may possess poor abrasion resistance or inferior low temperature properties. This situation is illustrated by the polymers obtained with the four major catalyst systems which have been developed and commercially used for stereospecific ploymerization of 1,3-butadiene in the United States, namely, (a) n-butyl lithium, (b) cobalt chloride-aluminum diethyl chloride complexes, (c) titanium tetrachloride-iodine-aluminum alkyl complex, and (d) complex of titanium halides with organo-magnesium compounds. These separate catalyst systems produce polybutadienes that vary considerably in molecular weight distribution and processability. Type (a) polymer is very narrow in molecular weight distribution and processes poorly on two roll mills. Type (b) has a broad molecular weight distribution, but requires pre-processing with fatty acid to process well on cold and hot roll mills. Types (c) and (d) are narrow in molecular weight distribution, and process well on cold mills, but tend to bag and shred on hot roll mills.

The automobile tire industry and other users of butadiene polymers have need for polybutadiene which is of improved characteristics and properties as compared with those which have been available heretofore. Specifically, a polybutadiene having all of the superior physical properties of natural ruber or synthetic rubbers previously available and which at the same time processes well without addition of other polymer would greatly increase the use of polybutadiene in the mechanical goods market and in master batching operations.

OBJECTS

A principal object of this invention is the provision of new homogeneous polymerization catalysts soluble in aromatic solvents and capable of polymerizing 1,3-butadiene into high molecular weight polymer that is prevailing cis-1,4 having superior physical properties and improved processability.

Further objects include:

(1) The provision of new methods for polymerization of 1,3-butadiene to form polybutadiene of superior mechanical properties and processability.

(2) The provision of new forms of polybutadiene which can be processed according to established rubber compounding and fabricating techniques without need to blend with other polymers and particularly useful in manufacture of mechanical goods and in master batching.

(3) The provision of new methods for making homogeneous, soluble metallo-organic catalysts from titanium tetraiodide, organic amine and trialkyl aluminum.

(4) The provision of new homogeneous, soluble polymerization catalysts capable of polymerizing 1,3-butadiene into high molecular weight polymer that exhibits superior combinations of characteristics and properties includng superior tear strength, good nurve, elongation, tack, excellent gum strength, low cold flow, fine film-forming characteristics and excellent processability on both cold and hot roll mills.

(5) The provision of new polymerization procedures using homogeneous organometallic catalysts to convert butadiene into rubbery polymer having very low cold flow, good Mooney viscosity and higher intrinsic viscosity than cis-1,4 polymers available heretofore.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those sklled in the art from this detailed description. It should also be understood the foregoing abstract of the disclosure is for the purpose of providing a non-legal brief statement to serve as a searching-scanning tool for scientists, engineers and researchers and is not intended to limit the scope of the invention as disclosed herein nor is it intended it should be used in interpreting or in any way limiting the scope or fair meaning of the appended claims.

GENERAL DESCRIPTION

These objects are accomplished according to the present invention through the discovery that a homogeneous catalyst comprising a solvent, titanium tetraiodide, an organic amine containing only carbon, hydrogen and nitrogen atoms and trialkyl aluminum can be created having unique properties provided the catalyst components are charged or combined in the following order:

(a) Solvent
(b) Titanium tetraiodide
(c) Organic amine
(d) Trialkyl aluminum

Polmerization catalysts prepared by combining the ingredients in this order are unique in several respects to catalysts formed of the same ingredients, but in different order of addition.

Advantageously, the new catalysts are prepared not only by combining ingredients in the specified order, but also in certain proportions. Using the titanium tetraiodide content of the catalysts as the datum ingredient, the other components of the catalyst would be in the following ranges of moles for each mole of titanium tetraiodide:

(a) Organic amine—between 0.23 and 5.7
(b) Trialkyl aluminum—between 1.3 and 100

Following preparation of the catalysts as indicated, polymerization of the butadiene is accomplished by contacting the monomer with the catalyst under substantially anhydrous conditions at a temperature within the range of zero to 150° C. and preferably in the range of 10 to 80° C. The proportion of catalyst to butadiene may be varied, but advantageously this ratio is held within a range which can be expressed in terms of the titanium tetraiodide content of the catalyst of about 11 to 28 moles for every 100,000 moles of butadiene contacted with the catalyst. The time of polymerization can be varied but advantageously, is from 2 to 64 hours, the time depending primarily on the amount of catalyst charge employed, particularly in the case of batch processes.

Polymerization may be performed as a batch or continuous process. At the completion of the polymerization reaction, the resulting high molecular weight butadiene polymer is recovered by first deactivating the catalyst in the reaction mixture by adding an alcohol. Advantageously, a rubber antioxidant is added to the reaction mixture prior to isolation of the polymer in order to prevent oxidation of the rubbery polymer. Polymer recovery can be accomplished by removing the hydrocarbon solvent by steam-stripping, azeotropic distillation or vacuum distillation. This is followed by drying of the polymer at elevated temperature, e.g., 50° C., preferably in a vacuum oven until a constant weight is obtained indicating removal of all volatile components.

The rubbery polymers which result when 1,3-butadiene is polymerized in accordance with this invention have a broad molecular weight distribution in which about at least 33% of the polymer is present as very broad high molecular weight tail having an intrinsic viscosity, measured in benzene, of 2.75 to 9 dl./g. and, in their preferred form, a microstructure of 2 to 4% trans-1,4 isomer, 7% 1,2 isomer and 88 to 91% cis-1,4 isomer. Such polymer can be readily compounded by any of the known methods used by the rubber industry for compounding natural and synthetic rubber. For example, in producing vulcanizable compositions, the normal accelerators, sulfur, reinforcing agents, plasticizers and fillers can be easily compounded with the polymer. Also, these new rubbery polybutadienes exhibit excellent nerve, gum strength, film-forming characteristics, very low cold flow and excellent processing qualities on both cold and hot roll mills. The polymers broadly have a microstructure of 4 to 20% trans-1,4; 8 to 20% 1,2 and 60 to 91% cis-1,4 isomer, these percentages depending to some extent upon the mole ratio of amine to titanium tetraiodide contained in the catalyst. Further, the new polymers have a Mooney ML–4 viscosity comparable to commercially available cis-1,4 polybutadiene and a much higher intrinsic viscosity than such polymers.

DISCUSSION OF DETAILS

The trialkyl aluminum employed in the new catalyst system in a titanium tetraiodide-amine complex can be represented by the formula $R_3Al$, wherein R is an alkyl radical containing up to and including 8 carbon atoms. The alkyl groups can be either straight or branched-chain alkyls, for example, ethyl, propyl, isopropyl, n-butyl, isobutyl, pentyl, isohexyl, n-hexyl or octyl. The preferred trialkyl aluminum is triethyl-alumina (TEA) or triisobutyl aluminum (TBA).

Mixtures of trialkyl aluminum may be used in the new catalyst systems. The amount of trialkyl aluminum used is advantageously in the range of 1.25 to 100 moles per mole of titanium tetraiodide. The preferred ratio is from 1.5 to 35 moles of trialkyl aluminum per mole of titanium tetraiodide with the optimum mole ratio being 6.6 to 1.

A second essential ingredient of the new catalysts is an organic amine which contains oly carbon, hydrogen and nitrogen atoms. In this class, one may use any primary, secondary, tertiary and cyclic amines, e.g., phenyl-beta-napthylamine, cyclohexylamine, isopropylamine, pyridine, triethylamine, n-, sec-, tert-butylamine, aniline, benzylamine, diphenylamine, diamylamine, dibutylamine, dicyclohexylamine, diethylamine, etc., in conjunction with the TTI and $R_3Al$ to produce the new, highly processable polybutadiene. The amine compounds may contain more than one amine group, that is, they may be diamines, triamines, etc. Advantageously, the amine will contain 2 to 26 carbon atoms. Alkyl amines of 2 to 12 carbon atoms produce excellent catalysts.

The amount of amine used in the catalyst composition of this invention is usually in the range of 0.225 to 5.6 moles per mole of titanium tetraiodide, with a preferred ratio of 1.30 to 3.32 moles of amine per mole of titanium tetraiodide.

Solvents suitable for use in the polymerization process are aromatic hydrocarbons which do not contain materials known to be destructive to the catalyst composition of the invention. Such deleterious materials include carbon dioxide, oxygen, alcohols, ethers, water, acetylenic compounds, and active hydrogen compounds. It is highly desirable, therefore, that the aromatic hydrocarbon solvents, as well as the 1,3-butadiene, be freed of these materials which tend to inactivate the catalyst. Any of the known means for removing such contaminants can be used, e.g., passing the solvent or 1,3-butadiene over silica gel, aluminum oxide, distillation from an aluminum alkyl, or passing over a bed of suitable "Linde" molecular sieves which have been previously heated to 300° C. for 16 hours under a flow of lamp grade nitrogen. Suitable solvents include aromatics, which are solvents for the catalyst as well as for the polymer, e.g., benzene, toluene, xylene, ethylbenzene and mixtures of each. Paraffinic hydrocarbons can also be used as diluents when mixed with the aromatics up to 50% by volume of the solvent-diluent mix, preferably not over 25% of the solvent-diluent mix. It is preferable to use monocyclic aryl hydrocarbons, and, particularly, benzene.

The amount of titanium tetraiodide used in the catalyst composition is usually in the range of $1.12 \times 10^{-4}$ moles to $2.8 \times 10^{-4}$ moles per mole of charged 1,3-butadiene with a preferred quantity of $1.87 \times 10^{-4}$ moles per mole of 1,3-butadiene charged to the polymerization reactor.

The amount of the catalyst composition of this invention which is used in the polymerization of 1,3-butadiene can vary over a wide range. The concentration of the total catalyst composition is usually in the range of about 0.05 weight percent to over 12 weight percent, or higher, preferably in the range of 0.05 weight percent to 6 percent, based on the total amount of 1,3-butadiene charged to the polymerization reactor.

The polymerization method of this invention can be performed at any temperature within the range of zero to 150° C., but it is preferred to operate in the range of 10 to 80° C.

The process of this invention can be performed as a batch or continuous process; however, as previously stated, it is critical that the order of addition of the reactants must be followed. The type of apparatus used to prepare the new catalysts and polymers is not critical. Any forms of equipment known to the art to be useful in preparing diolefin polymers with organometallic catalysts may be employed. Polymerization should be conducted under substantially anhydrous, oxygen-free conditions.

The time for polymerization can be for two to as high as 64 hours or more depending on the catalyst charge when a batch process is being employed. At the completion of the polymerization reaction, the total reaction mixture is then treated to inactivate the catalyst by adding an acoholl. An antioxidant, e.g., phenyl-beta-naphthylamine can be added to the solution to prevent oxidation of the rubbery polymer. The solvent or solvent-diluent mix can be removed by steam-stripping or azeotroping with boiling water or vacuum distillation. The rubbery polybutadiene is dried in a vacuum oven at 50° C. until a constant weight is obtained.

EXAMPLES

A more complete understanding of the new methods and products of the invention may be had by reference to the following working examples of actual operations performed in accordance with the invention. In these examples and throughout the remaining specification and claims, all parts and percentages are by weight unless otherwise specified.

Example I

A series of polymerizations was made in which 1,3-butadiene was polymerized to a rubber polymer employing a number of different catalysts. The polymerizations as reported in the following Table I show that the order of addition of the catalyst components and solvent have a profound effect upon the properties of the polymer produced.

In the following table, the solvent was charged initially and the 1,3-butadiene was charged last while the catalyst components were charged in the listed order.

TABLE I

| Catalyst | Solvent | Type of Polymer | Processability |
|---|---|---|---|
| TBA plus TTI | Benzene (3 p.p.m. $H_2O$) | Short, narrow molecular weight distribution | Poor. |
| TTI plus TBA | do | do | Do. |
| TTI plus TBA (high Al/Ti mole ratio) | do | Low conversion of a rubbery film-forming rubber | Excellent. |
| TBA plus TTI plus $H_2O$ | do | Short, high Mooney polymer | Poor. |
| TBA plus $H_2O$ plus TTI | do | do | Do. |
| TTI plus $H_2O$ plus TBA | do | Somewhat extensible high Mooney polymer | Fair. |
| TTI plus TBA plus amine | do | Short, high Mooney polymer | Poor. |
| TBA plus amine plus TTI | do | Short, low molecular weight polymer | Do. |
| TTI plus amine plus TBA | do | Rubbery, extensible, film-forming | Excellent. |
| TBA plus TTI | Toluene (16 p.p.m. $H_2O$) | Short, high conversion of low molecular weight polymer | Poor. |
| TTI plus TBA | do | Rubbery, extensible film-forming | Excellent. |
| TTI plus amine plus TBA | do | Tough, rubbery, film-forming | Do. |
| TTI plus HI plus TBA | Benezene (3 p.p.m. $H_2O$) | Soft, short, high conversion, low molecular weight polymer | Poor. |
| TTI plus TBA | Toluene (3 p.p.m. $H_2O$) | Rubbery, film-forming | Excellent. |

TTI=Titanium tetraiodide.
TBA=Triisobutyl aluminum.
HI=Hydrogen iodide.

Example II

A number of runs were made in which 1,3-butadiene was polymerized to a rubbery polymer employing a homogeneous catalyst system in a solvent comprising titanium tetraiodide, phenyl-beta-naphthylamine, and triisobutyl aluminum. These runs were carried out using the following procedure.

Benzene (dried over conditioned "Linde 4A" molecular sieves) was charged to a nitrogen flushed one-quart beverage bottle, after which an amount of titanium tetraiodide, phenyl-beta-naphthylamine, and triisobutyl aluminum solutions in benzene were charged into the capped bottle through the crown punched cap containing a butyl gasket and Teflon liner, by means of a syringe. The 1,3-butadiene was then charged into the bottle by inserting through the cap of the bottle a hypodermic needle which was attached to a valved stainless steel bomb. The 1,3-butadiene was charged by weight difference.

The bottle, after placing in a stainless steel safety can, was then rotated in water baths at various temperatures for various periods of time. At the end of this time, the bottle was removed, and after releasing any pressure in the bottle, 100 milliliters of isopropanol was mixed with the solution of polymer until all of the catalyst was deactivated. A benzene solution of phenyl-beta-naphthylamine (one weight percent based on charged 1,3-butadiene) was then mixed with the solution of polymer before steam-stripping the solvent. The wet polymer was dried in a vacuum oven at 50° C. until a constant weight was obtained. The polymer from each of these runs was then weighed to determine the yield, after which the polymer from each run was tested for Mooney ML–4 viscosity, intrinsic viscosity, gel content, and processability on a cold and 200° F. two roll mill.

The runs which were carried out by the above-described procedure were made according to the following polymerization recipe.

Polymerization recipe

Reactants: Parts by weight
Benzene _____ 440 (500 ml.).
Titanium tetraiodide (TTI) [1] ____ Variable.
Phenyl-beta-naphthylamine (PBNA) [2] _____ Variable.
Triisobutyl aluminum (TBA) [3] __ Variable.
Butadiene _____ 100.
TBA/TTI mole ratio _____ 6.55.
Temperature, °C. _____ Variable.
Time, hours _____ Variable.

[1] The concentration of a benzene solution of TTI was 0.00961 gms. TTI/ml. solution or 0.0173 mmole TTI/ml. solution.
[2] The concentration of a benzene solution of PBNA was 0.04 gms. PBNA/ml. solution or 0.182 mmole PBNA/ml. solution.
[3] The concentration of a benzene solution of TBA was 0.1292 gm. TBA/ml. solution or 0.6514 mmole TBA/ml. solution.

The results of some of these runs are presented below in Table II.

Example III

A series of runs was made in which 1,3-butadiene was polymerized to rubbery polymer in toluene (16 p.p.m. water) employing the same catalyst components, polymerization technique and work-up as used in Example I. The results of a number of these runs are presented below in Table III.

TABLE III

| TTI Parts by wt. | TTI Mmoles | TBA/TTI, mole ratio | PBNA/TTI, mole ratio | Temperature, ° C. | Time, hrs. | Conv., percent | Mooney ML–4 | $[\eta]^1$, dl.g/. | Processability |
|---|---|---|---|---|---|---|---|---|---|
| .221 | .399 | 6.55 | 1.45 | 80 | 18 | 94 | 17 | | Good. |
| .192 | .346 | 6.55 | 1.45 | 80 | 6 | 91 | 17 | 1.98 | Do. |
| .221 | .399 | 6.55 | 1.82 | 80 | 5 | 49 | 17 | 2.68 | Excellent. |
| .221 | .399 | 6.55 | 1.82 | 80 | 17 | 49 | 36 | 3.70 | Good. |
| .221 | .399 | 6.55 | 2.14 | 80 | 17 | 72 | 18 | 2.25 | Do. |
| .192 | .346 | 6.55 | 2.14 | 80 | 16 | 73 | 20 | 2.20 | Do. |
| .173 | .311 | 6.55 | 2.14 | 80 | 16 | 64 | 26 | 2.57 | Do. |
| .154 | .277 | 6.55 | 2.14 | 80 | 16 | 50 | 31 | 2.86 | Do. |
| .192 | .346 | 5.00 | 2.14 | 80 | 17 | 60 | 23 | 2.35 | Do. |
| .173 | .311 | 5.00 | 2.14 | 80 | 17 | 52 | 29 | 2.69 | Do. |
| .154 | .277 | 5.00 | 2.14 | 80 | 17 | 45 | 37 | 2.84 | Do. |
| [1].221 | .399 | 6.55 | | 80 | 5 | 76 | 29 | 2.88 | Excellent. |
| [1].221 | .399 | 6.55 | | 80 | 17 | 83 | 41 | 3.46 | Good. |

[1] Catalyst was TTI-TBA.

Example IV

A series of runs was made in which 1,3-butadiene was polymerized to rubbery polymer employing a homogeneous solution catalyst system consisting of solvent, titanium tetraiodide, cyclohexylamine, and triisobutyl aluminum. The procedure by which these runs were carried out is similar to that used in Example I. The runs were made according to the following polymerization recipe.

Polymerization recipe

Reactants: Parts by weight
Benzene _____ 440 (500 ml.).
Titanium tetraiodide (TTI) _____ Variable.
Cyclohexylamine (CHA) [1] _____ Variable.
Triisobutyl aluminum (TBA) ___ Variable.
Butadiene _____ 100.
TBA/TTI mole ratio _____ 6.55.
Temperature, ° C. _____ Variable.
Time, hours _____ Variable.

[1] The concentration of a benzene solution of cyclohexylamine was 0.0174 gm. CHA/ml. solution or 0.176 mmole CHA/ml. solution.

TABLE II

| TTI Parts by wt. | TTI Mmoles | TBA/TTI, mole ratio | PBNA/TTI, mole ratio | Temperature, ° C. | Time, hrs. | Conv., percent | Mooney ML–4 | $[\eta]^1$, dl./g. | Processability [2] |
|---|---|---|---|---|---|---|---|---|---|
| .221 | .399 | 6.55 | 0.225 | 35 | 18 | 90.5 | 98 | 3.80 | Shredded. |
| .221 | .399 | 6.55 | 0.450 | 35 | 18 | 87 | 39 | 2.60 | Fair. |
| .221 | .399[3] | 6.55 | 0.225 | 35 | 18 | 96 | 27 | 2.10 | Poor. |
| .221 | .399[3] | 6.55 | 0.450 | 25 | 18 | 94 | 25 | 2.03 | Do. |
| .221 | .399 | 6.55 | 1.13 | 35 | 16 | 92 | 57 | 2.88 | Fair. |
| .221 | .399 | 6.55 | 2.82 | 35 | 64 | 95 | 45 | 2.82 | Do. |
| .221 | .399 | 6.55 | 3.96 | 35 | 16 | 53 | 41 | 2.56 | Do. |
| .221 | .399 | 6.55 | 5.64 | 35 | 64 | 28 | | 1.98 | Good. |
| .221 | .399 | 4.00 | 5.64 | 35 | 16 | 71 | 47 | 2.58 | Fair. |
| .221 | .399 | 6.55 | 2.25 | 50 | 1 | 63 | 28 | 2.30 | Do. |
| .221 | .399 | 6.55 | 2.52 | 50 | 3 | 70 | 33 | 2.50 | Good. |
| .221 | .399 | 6.55 | 2.25 | 50 | 5 | 84 | 28 | 2.30 | Fair. |
| .221 | .399 | 6.55 | 2.25 | 50 | 7 | 89 | 26 | 2.30 | Do. |
| .221 | .399 | 6.55 | 2.25 | 50 | 16 | 97 | 31 | 2.36 | Do. |
| .221 | .399 | 6.55 | 2.25 | 50 | 64 | 98–100 | 33 | 2.30 | Do. |
| .192 | .346 | 6.55 | 3.25 | 50 | 17 | 50 | 34 | 3.00 | Good. |
| .192 | .346 | 6.55 | 3.25 | 50 | 64 | 73 | 29 | 3.00 | Excellent. |
| .192 | .346 | 6.55 | 3.25 | 50 | 64 | 82 | 33 | 3.00 | Do. |
| .135 | .242 | 6.55 | 3.30 | 50 | 18 | 36 | 49 | 4.00 | Good. |
| .221 | .399 | 6.55 | 2.87 | 80 | 22 | 39 | 10 | 1.94 | Do. |
| .192 | .346 | 6.55 | 3.32 | 80 | 18 | 58 | 14 | 2.38 | Excellent. |
| .192 | .346 | 6.55 | 2.63 | 80 | 18 | 88 | 8 | 1.58 | Good. |
| .135 | .242 | 6.55 | 3.30 | 80 | 18 | 51 | 14 | 2.20 | Do. |

[1] Measured in benzene at 25° C.
[2] Processability was based on the ability of the polymer to band on 3″ x 6″ two roll mill heated to 200° F. The degree of processibility is expressed in the following manner: shredded-non-banding, dropped off mill rolls; poor-partial banding, no rolling bank; fair-banded, poor rolling bank; good-rolling bank; excellent-smooth rolling bank.
[3] The order of catalyst addition was TBA, amine, and then TTI.

The results of these runs are presented below in Table IV.

TABLE IV

| TTI | | TBA/ TTI, mole ratio | CHA/ TTI, mole ratio | Temperature, °C. | Time, hrs. | Conv., percent | Mooney ML-4 | [η] dl./g. | Processability |
|---|---|---|---|---|---|---|---|---|---|
| Parts by wt. | Mmoles | | | | | | | | |
| .221 | .399 | 6.55 | 0.903 | 35 | 41 | 57 | 21 | 2.15 | Excellent. |
| .221 | .399 | 6.55 | 1.35 | 35 | 41 | 42 | 29 | 2.40 | Do. |
| .221 | .399 | 6.55 | 1.80 | 35 | 41 | 28 | | 2.90 | Good. |
| .221 | .399 | 6.55 | 2.25 | 35 | 41 | 13 | | 3.50 | Fair. |
| .221 | .399 | 6.55 | 2.82 | 35 | 66 | 22 | | 4.38 | Do. |
| .288 | .519 | 6.55 | 1.80 | 35 | 66 | 44 | 23 | 2.20 | Good. |
| .192 | .346 | 6.55 | 1.82 | 50 | 20 | 53 | 50 | 2.90 | Do. |
| .192 | .346 | 6.55 | 1.82 | 50 | 66 | 70 | 52 | 3.25 | Do. |
| .192 | .346 | 6.55 | 2.08 | 50 | 18 | 42 | 31 | 4.75 | Fair. |
| .192 | .346 | 6.55 | 1.32 | 80 | 18 | 89 | 38 | 3.00 | Good. |
| .135 | .242 | 6.55 | 1.65 | 80 | 18 | 83 | 74 | 4.00 | Fair. |
| .192 | .346 | 6.55 | 1.32 | 80 | 3 | 80 | 66 | 3.10 | Good. |
| 1.192 | .346 | 6.55 | 1.32 | 80 | 3 | 65 | 78 | 4.04 | Fair. |

[1] Polymerization of 1,3-butadiene was performed in toluene containing 16 p.p.m. water.

Example V

A series of runs was made in which 1,3-butadiene was polymerized to rubbery polymer employing a homogeneous catalyst system consisting of titanium tetraiodide, isopropylamine, and triisobutyl aluminum in solvent. The procedure by which these runs were carried is similar to that used in Example I.

The runs were made according to the following polymerization recipe.

Polymerization recipe

| Reactants: | Parts by weight |
|---|---|
| Benzene | 440 (500 ml.). |
| Titanium tetraiodide (TTI) | Variable. |
| Isopropylamine (IPA)[1] | Variable. |
| Triisobutyl amide (TBA) | Variable. |
| Butadiene | 100. |
| TBA/TTI mole ratio | 6.55. |
| Temperature, °C. | Variable. |
| Time, hours | Variable. |

[1] The concentration of a benzene solution of isopropylamine was 0.01062 gm. IPA/ml. solution or 0.180 mmole IPA/ml. solution.

The results of these runs are presented below in Table V.

TABLE V

| TTI | | TBA/ TTI, mole ratio | IPA/ TTI, mole ratio | Temperature, °C. | Time, hrs. | Conv., percent | Mooney ML-4 | [η] dl/g. | Processability |
|---|---|---|---|---|---|---|---|---|---|
| Parts by wt. | Mmoles | | | | | | | | |
| .192 | .346 | 6.55 | 1.82 | 50 | 18 | 67 | 40 | 2.65 | Good. |
| .173 | 1.311 | 6.55 | | 50 | 16 | 97 | 28 | 2.11 | Poor. |
| .173 | .311 | 6.55 | 1.82 | 50 | 16 | 54 | 57 | 3.52 | Fair. |
| .173 | 2.311 | 6.55 | 1.82 | 50 | 16 | 97 | 60 | 2.86 | Poor. |
| .192 | .346 | 6.55 | 1.30 | 80 | 18 | 95 | 24 | 2.50 | Good. |
| .192 | .346 | 6.55 | 1.30 | 80 | 3 | 91 | 42 | 2.50 | Do. |
| .192 | .346 | 6.55 | 1.48 | 80 | 16 | 91 | 54 | 2.62 | Do. |
| .135 | .242 | 6.55 | 1.64 | 80 | 18 | 96 | 56 | 3.30 | Do. |
| .154 | .277 | 6.55 | 1.95 | 80 | 20 | 74 | 62 | 3.14 | Fair. |
| .192 | 3.346 | 6.55 | 1.30 | 80 | 3 | 80 | 65 | 3.30 | Do. |
| .221 | 3.399 | 6.55 | | 80 | 5 | 54 | 48 | 3.97 | Good. |
| .221 | 3.399 | 6.55 | 0.57 | 80 | 22 | 87 | 42 | 3.30 | Do. |
| .221 | 3.399 | 6.55 | 0.57 | 80 | 5.5 | 62 | 51 | 3.95 | Do. |
| .221 | 4.399 | 6.55 | | 80 | 22 | 94 | 21 | 2.17 | Do. |

[1] Catalyst was TTI-TBA.
[2] Order of catalyst addition was TTI-TBA-IPA.
[3] The solvent in these four runs was toluene containing 16 p.p.m. water.
[4] Solvent was 50/50 of benzene (3 p.p.m. H₂O) and toluene (16 p.p.m. H₂O).

Example VI

A series of runs was made in which 1,3-butadiene was polymerized to rubbery polymer employing a homogeneous catalyst system consisting of solvent, titanium tetraiodide, pyridine, and triisobutyl aluminum. The procedure by which these runs were carried out is similar to that used in Example II.

The runs were made according to the following polymerization recipe.

Polymerization recipe

| Reactants: | Parts by weight |
|---|---|
| Benzene | 440 (500 ml.). |
| Titanium tetraiodide (TTI) | 0.221. |
| Pyridine (PY)[1] | Variable. |
| Triisobutyl aluminum (TBA) | Variable. |
| Butadiene | 100. |
| TBA/TTI mole ratio | 6.55. |
| Temperature, °C. | 80. |
| Time, hours | Variable. |

[1] The concentration of a benzene solution of pyridine was 0.0196 gm. PY/ml. solution or 0.248 mmole PY/ml. solution.

The results of these runs are presented in Table VI.

TABLE VI

| TTI | | TBA/ TTI, mole Ratio | PY/ TTI, mole ratio | Time, hrs. | Conv., percent | Mooney ML-4 | [η] dl/g. | Processability |
|---|---|---|---|---|---|---|---|---|
| Parts by Wt. | Mmoles | | | | | | | |
| .221 | 1.399 | 6.55 | 0.62 | 5 | 90 | 16 | 1.93 | Good. |
| .221 | .399 | 6.55 | 1.87 | 5 | 73 | 38 | 2.89 | Do. |
| .221 | .399 | 6.55 | 1.87 | 65 | 99 | 29 | 2.41 | Do. |
| .221 | .399 | 4.00 | 1.87 | 5 | 99 | 52 | 2.57 | Fair. |
| .221 | 2.399 | 6.55 | | 5 | 47 | 50 | 3.39 | Good. |
| .221 | .399 | 6.55 | 0.62 | 5 | 49 | 53 | 3.87 | Fair. |
| .221 | .399 | 6.55 | 1.87 | 5 | 52 | 62 | 4.08 | Do. |

[1] The solvent in the first four runs was benzene containing 3 p.p.m. water.
[2] The solvent in the last three runs was toluene containing 16 p.p.m. water.

EXAMPLE VII

The microstructure of most of the polybutadiene rubbers are reported in the preceding examples was determined by infrared analysis. Such determination of the percentage of polymer formed as cis-1,4 addition, trans-1,4 addition and 1,2 addition of the butadiene was performed by dissolving the polymer in carbon disulfide to form a solution having 20 grams of polymer per liter of solution. The infrared spectrum of each of the solutions (percent transmission) was then determined in a Perkin-Elmer infrared Spectrophotometer Model 21. The percent of the total unsaturation present as trans-1,4 was calculated according to the equation $e=E/tc$ in which:

$e$=extinction coefficient
$E$=extinction (log $I_0/I$)
$t$=path length in microns
$c$=concentration in moles double bond per liter.

The extinction was determined at the 10.35 microband and the extinction coefficient used was 0.00121.

The percent of total unsaturation present as 1,2-vinyl was calculated according to the above equation, using the 11.0 microband and an extinction coefficient of 0.00152.

The percent of total unsaturation present as cis-1,4 was obtained by subtracting the trans-1,4 and 1,2-vinyl determined according to the described methods from the theoretical unsaturation assuming one double bond per butadiene unit in the polymer.

The results of some of the polymers described in the preceding examples are presented in Table VII.

The addition of TTI to the toluene produced reddish brown solutions. Upon addition of the pyridine in B, the solution turned a green color. Upon addition of the TBA in both A and B, the solutions turned a light, reddish brown color.

To each of the catalyst solutions there were charged 100 parts of 1,3-butadiene. The polymerizations were then conducted at 80° C. for 16 hours. In the case of Catalyst A, no appreciable amount of polymer was formed. In the case of Catalyst B, there was an 84% conversion of monomer to polymer having an intrinsic viscosity of 4.12, a gel percent of 9.22 and a swelling index of 307.

SUMMARY

The invention as described above provides new forms of solvent soluble homogeneous metallo-organic catalysts for polymerization of 1,3-butadiene to prevailingly cis-1,4 polymer resulting from the discovery that unique properties in such catalysts can be obtained by using a specific order of adding and combining catalyst components for such polymerization reactions and in using certain specific proportions of components in forming the catalyst systems.

The embodiments of the invention in which an exclusive property or privilege is claimed are defined as follows:

1. The method of solution polymerizing 1,3-butadiene into high molecular weight prevailingly cis-1,4 polymer

TABLE VII

| TTI Parts by Wt. | TTI Mmoles | TBA/TTI, mole ratio | Amine | Amine/TTI, mole ratio | Temp., °C | Time, hrs. | Conv., percent | Percent trans | Percent 1,2 | Percent cis |
|---|---|---|---|---|---|---|---|---|---|---|
| .221 | .399 | 6.55 | PBNA | 1.13 | 35 | 16 | 92 | 2.6 | 5.4 | 92.0 |
| .221 | .399 | 6.55 | PBNA | 2.87 | 35 | 64 | 95 | 3.8 | 5.4 | 90.8 |
| .221 | .399 | 6.55 | PBNA | 3.96 | 35 | 16 | 53 | 2.1 | 5.2 | 92.7 |
| .221 | .399 | 4.00 | PBNA | 5.63 | 35 | 16 | 71 | 2.2 | 5.1 | 92.7 |
| .192 | .346 | 6.55 | PBNA | 2.87 | 50 | 17 | 50 | 3.7 | 6.7 | 89.6 |
| .192 | .346 | 6.55 | PBNA | 3.25 | 50 | 64 | 73 | 4.5 | 6.9 | 88.6 |
| .192 | .346 | 6.55 | PBNA | 3.25 | 50 | 64 | 82 | 3.8 | 6.4 | 89.8 |
| .192 | .346 | 6.55 | PBNA | 2.63 | 80 | 18 | 88 | 7.8 | 6.6 | 85.6 |
| .192 | .346 | 6.55 | PBNA | 3.32 | 80 | 18 | 58 | 7.0 | 7.7 | 85.3 |
| .154 | 2.277 | 6.55 | PBNA | 2.14 | 80 | 16 | 50 | 4.4 | 7.7 | 87.9 |
| .221 | 1.399 | 6.55 | | | 80 | 5 | 76 | 5.7 | 7.7 | 86.6 |
| .221 | 1.399 | 6.55 | | | 80 | 17 | 83 | 5.0 | 8.0 | 87.0 |
| .221 | .399 | 6.55 | CHA | 2.87 | 35 | 66 | 22 | 1.6 | 6.0 | 92.4 |
| .221 | .399 | 6.55 | CHA | 1.80 | 35 | 41 | 28 | 1.9 | 5.3 | 92.8 |
| .192 | .346 | 6.55 | CHA | 1.82 | 50 | 66 | 70 | 3.5 | 6.3 | 90.2 |
| .192 | .946 | 6.55 | CHA | 1.82 | 50 | 18 | 51 | 1.5 | 6.7 | 91.8 |
| .192 | .946 | 6.55 | CHA | 1.31 | 80 | 18 | 89 | 3.7 | 7.6 | 88.7 |
| .135 | .242 | 6.55 | CHA | 1.65 | 80 | 18 | 83 | 2.4 | 7.5 | 90.1 |
| .192 | .346 | 6.55 | IPA | 1.82 | 50 | 18 | 67 | 2.8 | 6.0 | 91.2 |
| .173 | 1.311 | 6.55 | | | 50 | 16 | 97 | 5.4 | 4.4 | 90.2 |
| .192 | .346 | 6.55 | IPA | 1.82 | 80 | 18 | 95 | 4.9 | 7.2 | 87.9 |
| .192 | .346 | 6.55 | IPA | 1.82 | 80 | 3 | 91 | 3.5 | 5.9 | 90.6 |
| .221 | .399 | 6.55 | PY | 1.87 | 80 | 5 | 73 | 3.5 | 7.5 | 89.0 |
| .221 | .399 | 6.55 | PY | 1.87 | 80 | 5 | 52 | 2.9 | 10.5 | 86.6 |
| .221 | 1.399 | 6.55 | | | 80 | 5 | 47 | 5.3 | 8.2 | 86.5 |
| .221 | 3.399 | 6.55 | | | 80 | 18 | 99 | 11.6 | 4.9 | 83.5 |
| .221 | .399 | 6.55 | | | 80 | 18 | 98 | 12.7 | 5.5 | 81.8 |
| .221 | .399 | 6.55 | | | 80 | 18 | 93 | 19.3 | 5.4 | 75.3 |
| .221 | .399 | 6.55 | | | 80 | 18 | 27 | 20.4 | 5.1 | 74.5 |

1 Catalyst was TTI-TBA in toluene containing 16 p.p.m. water.
2 Solvent was toluene containing 16 p.p.m. water.
3 Catlyst in the last four runs was TTI-TBA-HI (hydrogen iodide).

EXAMPLE VIII

The stereospecific polymerization of 1,3-butadiene was attempted, following the procedure of Example 1, above, using two different catalysts prepared from the following ingredients mixed together in the order listed and in the parts stated:

| Ingredient | Catalyst A | Catalyst B |
|---|---|---|
| Toluene (anhydrous), grms | 434 | 434 |
| Titanium tetraiodide, mmoles | .399 | .399 |
| Pyridine, mmoles | | .744 |
| Triisobutyl aluminum, mmoles | .262 | .262 | possessing excellent processability on both cold and hot roll mills which comprises:

(A) providing the following ingredients:
   (a) aromatic hydrocarbon liquid,
   (b) titanium tetraiodide,
   (c) organic amine containing only carbon, hydrogen and nitrogen atoms of 2 to 26 carbon atoms,
   (d) trialkyl aluminum of 3 to 24 carbon atoms
(B) charging said ingredients in the order above listed into a vessel in the proportions within limits fixed by the following molar ratios:

$c:b$=between 0.23:1 and 5.7:1
$d:b$=between 1.3:1 and 100:1 to form a homogeneous solution, (C) contacting 1,3-butadiene with said solution under substantially anhydrous conditions at a temperature between 0 to 150° C. and a pressure between 10 to 1000 p.s.i.g., the quantity of solution relative to 1,3-butadiene being such that the moles of titanium tetraiodide to moles of 1,3-butadiene is within the range of $1.12 \times 10^{-4}$ to $2.8 \times 10^{-4}$ moles per mole of 1,3-butadiene contacted with the solution, and (D) recovering polybutadiene having a broad molecular weight distribution from the reaction mixture.

2. A method as claimed in claim 1 wherein said aromatic hydrocarbon liquid comprises at least 50% of monocyclic aromatic hydrocarbon and up to 50% of aliphatic liquid hydrocarbon.

3. A method as claimed in claim 1 wherein the temperature of step C is between 10 to 80° C. and said organic amine contains 2 to 12 carbon atoms.

4. A method as claimed in claim 1 wherein said aromatic hydrocarbon liquid is toluene, xylene or ethyl benzene.

5. A method as claimed in claim 1 wherein the polybutadiene recovered in step D has an intrinsic viscosity range of between 2.75 and 9 dl./g.

6. A method as claimed in claim 1 wherein the trialkyl aluminum has the formula $R_3Al$ wherein R is an alkyl radical containing 2 to 4 carbon atoms.

7. A homogeneous organometallic catalyst for use in the polymerization of unsaturated hydrocarbon consisting essentially of the following ingredients dissolved in the order stated in a solvent comprising at least 50% of aromatic liquid hydrocarbon:

(A) titanium tetraiodide
(B) organic amine containing only carbon, hydrogen and nitrogen atoms 2 to 26 carbon atoms,
(C) trialkyl aluminum of 3 to 24 carbon atoms, the proportion of said ingredients in said solution being within the limits fixed by the following molar ratios:

$B:A$ = between 0.23:1 and 5.7:1
$C:A$ = between 1.3:1 and 100:1

8. A catalyst as claimed in claim 7 wherein said solvent consists of toluene, xylene, ethylbenzene or mixtures thereof and said trialkyl aluminum has the formula $R_3Al$ wherein R is an alkyl radical containing 2 to 4 carbon atoms.

9. A polybutadiene made by the process of claim 1 having the following characteristics:

(a) a microstructure of 4 to 20% trans-1,4-butadiene, 8 to 20% trans-1,2-butadiene and 60 to 91% cis-1,4-butadiene,
(b) a broad molecular weight distribution,
(c) an intrinsic viscosity measured in benzene at 25° C. of 2.75 to 9 dl./g. and
(d) capable of producing a smooth rolling bank when processed on a 3" x 6" two roll mill heated to 200° F.

References Cited

UNITED STATES PATENTS 3,139,418   6/1964   Marullo _____ 260—93.7

JOSEPH L. SCHOFER, Primary Examiner

R. A. GAITHER, Assistant Examiner

U.S. Cl. X.R.
252—429